United States Patent [19]

Paragamian

[11] 3,818,038

[45] June 18, 1974

[54] PROCESS FOR PREPARING 2-OXOSPIRO[INDOLINE-3,4'-THIOCHROMANS]

[75] Inventor: Vasken Paragamian, Dresher, Pa.

[73] Assignee: McNeil Laboratories, Inc., Fort Washington, Pa.

[22] Filed: July 21, 1972

[21] Appl. No.: 274,021

Related U.S. Application Data

[62] Division of Ser. No. 137,043, April 23, 1971, Pat. No. 3,723,459.

[52] U.S. Cl. ............................................. 260/325
[51] Int. Cl. ............................................ C07d 27/40
[58] Field of Search ................................. 260/325

[56] References Cited

UNITED STATES PATENTS 3,314,950   4/1967   Wei et al. ................. 260/325 X

*Primary Examiner*—Joseph A. Narcavage
*Attorney, Agent, or Firm*—Salvatore R. Conte

[57] ABSTRACT

6,7-Dihydro-12H[1]benzothiepino-[5,4-b]indole-5-oxides are utilized as precursors for making certain 2-oxospiro[indoline-3,4'-thiochroman]derivatives, of which the ester and nitrile derivatives are useful as inhibitors of gastric acid secretion and the acid derivatives are useful as precursors for making the ester derivatives.

2 Claims, No Drawings

PROCESS FOR PREPARING 2-OXOSPIRO[INDOLINE-3,4'-THIOCHROMANS]

This is a divisional application of my co-pending application Ser. No. 137,043, filed Apr. 23, 1971, now U.S. Pat. No. 3,723,459.

This invention relates to certain novel organic compounds which may be structurally represented by the formulas:

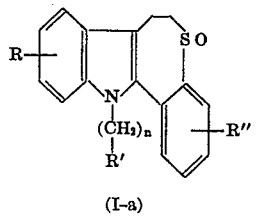

(I-a)

and

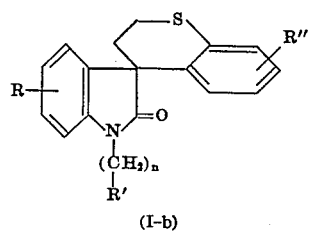

(I-b)

wherein n is an integer from 1 to about 4, R and R'' are each a member selected from the group consisting of hydrogen, halo, loweralkyl and loweralkoxy, and R' is a member selected from the group consisting of CN, COOH and COO(loweralkyl). The compounds of formula (I-a) are denoted as 6,7-dihydro-12-[$(CH_2)_n$-R']-12H[1]benzothiepino[5,4-b]indole-5-oxides and those of formula (I-b) as 1-[$(CH_2)_n$-R']-2-oxospiro[indoline-3,4'-thiochromans]. The former are useful precursors for making the latter.

As used herein, "loweralkyl" and "loweralkoxy" may be straight or branch chained saturated hydrocarbons having from 1 to 5 carbon atoms, such as, for example, methyl, ethyl, propyl, isopropyl, butyl, pentyl and the like alkyls, and, respectively, the corresponding alkoxys such as methoxy, ethoxy, propoxy, isopropoxy, etc. The term "halo" refers to iodo, bromo, chloro and fluoro.

The formula (I-a) sulfoxide compounds are obtained by conventional sulfide-to-sulfoxide oxidation of the corresponding 6,7-dihydro-12-[$(CH_2)_n$-R']-12H[1]benzothiepino[5,4-b]-indoles of formula (II), for example, by treatment with sodium metaperiodate in a aqueous lower alkanol solvent or hydrogen peroxide in acetic acid as the oxidizing agent:

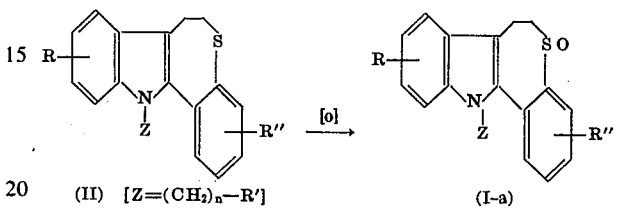

(II) [Z=$(CH_2)_n$—R']       (I-a)

The sulfide precursors of formula (II) may be prepared from the corresponding N-unsubstituted sulfides of formula (III);

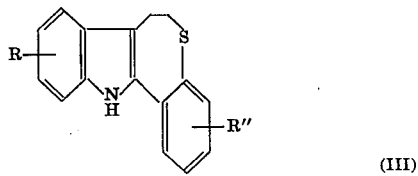

(III)

Treatment of (III), preferably in the form of an alkali metal salt, with (a) a haloalkyl nitrile of the formula: halo-$(CH_2)_n$-CN, or (b) a haloalkyl ester of the formula: halo-$(CH_2)_n$-COO(loweralkyl), wherein halo is preferably bromo or chloro and n is an integer from 1 to about 4, or (c) acrylonitrile, affords the following N-substituted sulfides of formula (II):

(a)

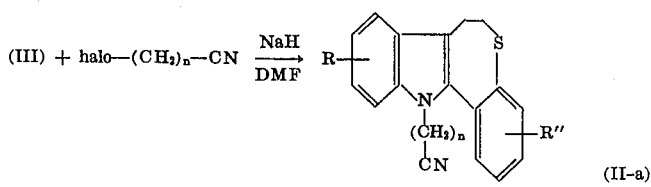

(II-a)

(b)

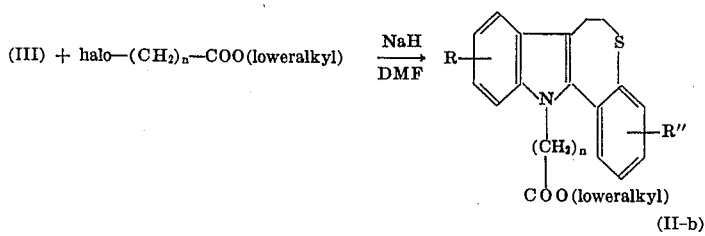

(II-b)

(c)

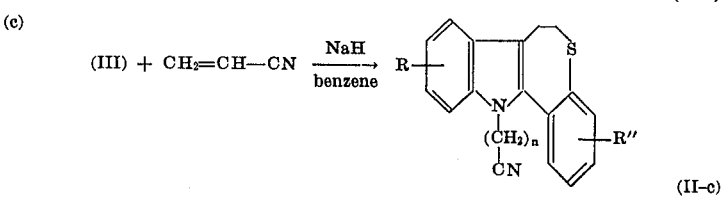

(II-c)

The foregoing reactions are preferably conducted in aprotic organic solvents, for example, an aromatic hydrocarbon such as benzene, toluene, xylene and the like; an ether such as dioxane, tetrahydrofuran, dimethoxyethane and the like; and dimethylformamide (DMF). Temperatures of about 40°–80°C. and reaction times of about 2–6 hours are generally suitable.

The acid derivatives of formula (II), i.e., where Z = $(CH_2)_n$-COOH, are readily obtained by standard hydrolysis, which may be effected with either acid or base as catalyst, of the corresponding nitriles (II-a) and (II-c) or esters (II-b). In turn, the acids (II-d) may be subjected to conventional esterification with a lower alkanol in the presence of a catalytic amount of an acid such as HCl, $H_2SO_4$ and the like to yield the corresponding esters (II-b). Alternatively, the esters (II-b) may be obtained from the nitriles (II-a) and (II-c) by standard nitrile-to-ester transformation procedures.

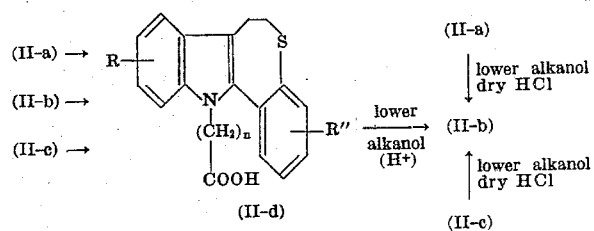

The formula (I-a) compounds may be alternatively prepared by the following reaction scheme:

a. treating the N-unsubstituted sulfoxide of formula (IV), preferably in the form of an alkali metal salt, said sulfoxide being obtained by the previously described sulfide-to-sulfoxide oxidation of the corresponding N-unsubstituted sulfide (III), with an appropriate haloalkyl nitrile of the formula: halo-$(CH_2)_n$-CN, or with an appropriate haloalkyl ester of the formula: halo-$(CH_2)_n$-COO(loweralkyl), or with acrylonitrile, to yield the corresponding N-$(CH_2)_n$-CN (V), or N-$(CH_2)_n$-COO(loweralkyl) (VI), or N-$(CH_2)_2$-CN (V-a), derivatives, respectively;

b. hydrolyzing said nitrile function of (V) to the acid form (VII) under alkaline conditions;

c. hydrolyzing the ester function (VI) to the acid form (VII) under alkaline conditions; and d. esterifying the acid (VII) with a lower alkanol to obtain the ester (VI).

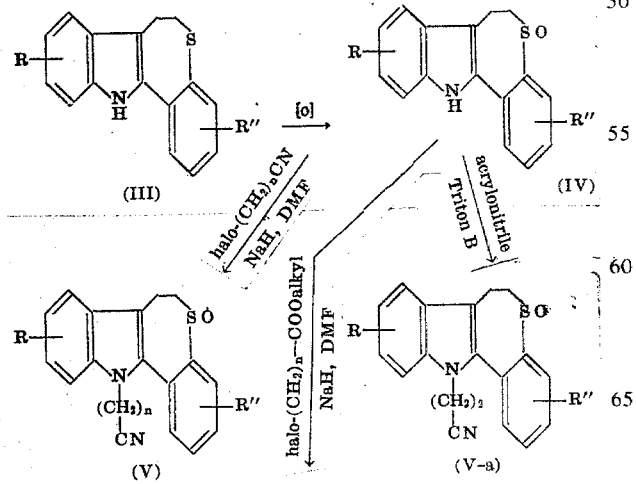

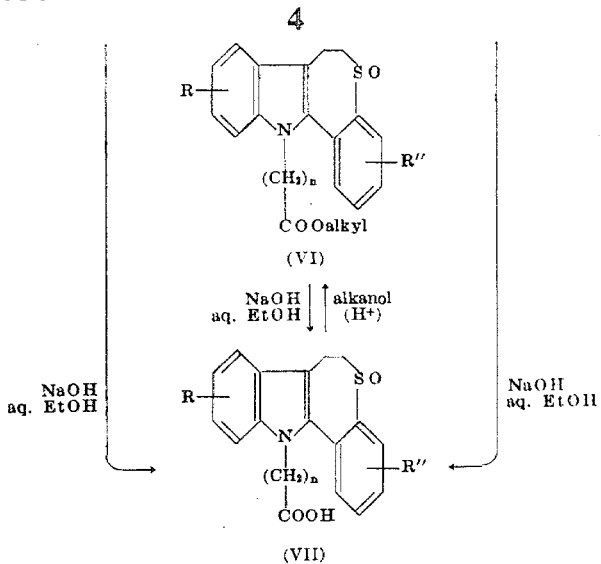

The sulfides of formula (III), wherein R and R'' are each hydrogen, are described in Aksanova et al., Zh. Obshch. Khim., 34, 3375 (1964). In general, the formula (III) sulfides may be prepared by reacting an appropriate thiophenol of formula (VIII) with γ-butyrolactone (IX) according to the method described by Traynelis et al., J. Org. Chem., 26, 2728 (1961), to yield the γ-phenylmercaptobutyric acid of formula (X), which is then subjected to ring-closure under acidic dehydrating conditions, for example, by heating with polyphosphoric acid, and then reacting the thus-obtained 5-oxo-2,3,4,5-tetrahydro-benzo[b]thiepin of formula (XI) with an appropriate phenylhydrazine of formula (XII), which may be used in the form of a hydrochloride salt, under Fischer indole synthesis conditions, for example, with dry HCl in ethanol, to yield the desired compounds of formula (III):

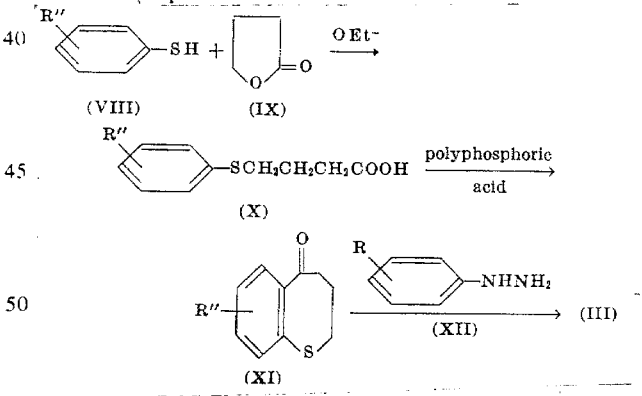

The formula (I-a) compounds are useful precursors for making the compounds of formula (I-b). The formation of the spiro type latter compounds may be accomplished by several routes, for example:

a. by treating the formula (I-a) starting material with a small amount of an acid such as HCl and HBr, generally from about 20–50 percent of the molecular equivalent of acid based on the molar amount of the (I-a) precursor employed in a suitable anhydrous aprotic solvent, such as, for example, an aromatic hydrocarbon, e.g., benzene, toluene, xylene and the like, or an ether such as dioxane, diethylether, dimethoxy ethane, tetrahydrofuran and the like. Alternatively, a system may be employed consisting of from about 0.1 to about 0.2 molecular equivalents of concentrated $H_2SO_4$ in a lower alkanoic solvent, preferably absolute methanol or ethanol, in which case, however, lower yields of the desired (I-b) compounds are obtained. In general, ambient temperatures may be employed although elevated temperatures can be used to enhance the rate of reaction;

b. by treating the formula (I-a) starting material with hydrochloric or hydrobromic aqueous acid solution (10 – 20 percent) under reflux conditions; and c. by treating the formula (I-a) starting material with from 1 to about 2 molecular equivalents of either acetyl chloride, oxalyl chloride or acetic acid anhydride in an anhydrous aprotic solvent such as previously mentioned for route (a) and, in addition, a halogenated lower alkane, e.g., dichloroethane, chloroform, dichloromethane and the like. With acetyl chloride and oxalyl chloride, ambient temperatures may be employed although elevated temperatures can be used to enhance the rate of reaction, and with acetic acid anhydride, temperatures of about 80°–90°C. are preferred.

The foregoing (I-a)-to-(I-b) transformation procedures may be schematically exemplified as follows:

chloride or oxalyl chloride. Lesser yields are obtained with acetic acid anhydride.

With regard to route (a), it should be borne in mind that when the formula (I-a) precursor is an ester, that is, when R' is COO(loweralkyl), and a lower alkanol is employed as the solvent, then transesterification may occur if the loweralkyl hydrocarbon of the ester function and the alkanol are different. Likewise, when the formula (I-a) precursor is an acid, that is, when R' is COOH, and a lower alkanol is employed as the solvent, then esterification will occur.

The foregoing (I-a)-to-(I-b) transformation procedures are believed to be novel methods and, as such, they constitute an additional feature of this invention.

An alternative method of preparing the esters and acids of formula (I-b) is from the corresponding nitriles of formula (XIII). Hydrolysis of the nitrile function to the acid form according to standard nitrile-to-acid procedures, or transformation of the nitrile function to the ester form according to standard nitrile-to-ester procedures, affords the corresponding acids (XIV) and esters (XV). The acids in turn may be esterified with an appropriate lower alkanol to yield the corresponding

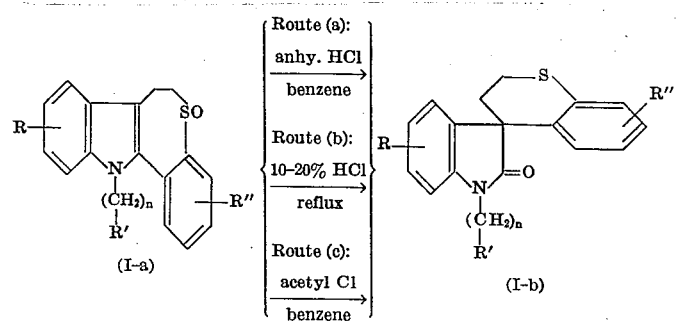

The preferred method of making the formula (I-b) compounds is by way of route (c) using either acetyl esters (XV). Likewise, hydrolysis of the latter affords the corresponding acids (XIV).

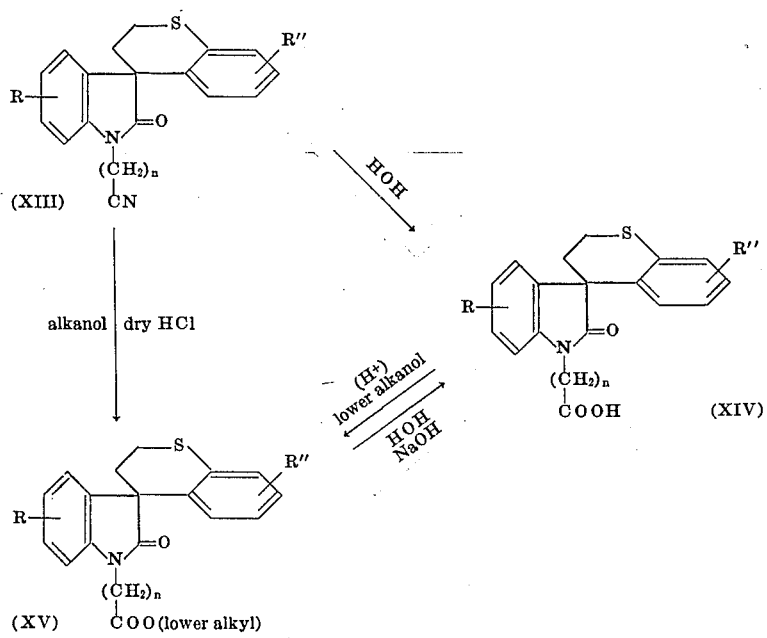

Accordingly, the formula (XIII) nitriles are useful precursors for making the acids and esters of formula (I-b). The formula (XIV) acids are useful precursors for making the formula (XV) esters. In addition, the formula (XIII) nitriles and the formula (XV) esters, which are the preferred embodiments of the present invention, have been found to possess pharmacological activity as inhibitors of gastric acid secretion in pyloric-ligated rats [according to the method of Shay et al., Gastroenterology, 26, 906, (1954)] at doses of 50–200 mg/kg body weight i.p., which activity is an indication of usefulness in a number of gastrointestinal disorders such as, for example, ulcers.

The preferred compounds of this invention are those wherein the substituents R and R'', when other than hydrogen, are in the 9-position and 2-position, respectively, of the formula (I-a) compounds; and in the 5-position and 6'-position, respectively, of the formula (I-b) compounds:

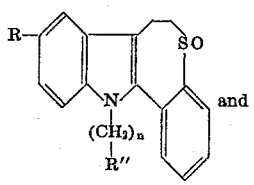 and 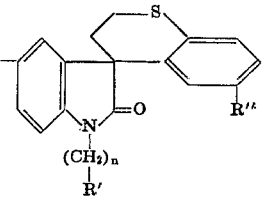

(I-a, preferred)    (I-b, preferred)

The following examples are presented in order to illustrate, but not to limit the scope of, the subject invention.

EXAMPLE I

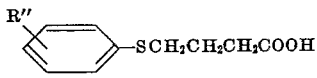
(X)

A. To a solution of potassium ethoxide prepared from potassium (7.8 g., 0.20 g.-atom) and 50 ml. of absolute ethanol is added a solution of thiophenol (22 g., 0.20 mole) in 150 ml. of diethyl carbitol. After the ethanol is removed by distillation, γ-butyrolactone (18 g., 0.21 mole) in 100 ml. of diethyl carbitol is added slowly and the resulting slurry heated with rapid stirring for 3 hr. at 170°–175°C. To the cooled reaction mixture is added 300 ml. of water and the solution washed with two 300 ml. portions of ether. The aqueous solution is acidified with hydrochloric acid; after the resulting precipitate is collected and dried, crystallization from petroleum ether (b.p. 60°–80°C.) gives 36 g. (92%) of γ-phenylmercaptobutyric acid, m.p. 68°–69°C.

B. The procedure of Example I-A may be followed to prepare the compounds of formula (X) by employing an appropriate thiophenol of formula (VIII) as the starting material. For example, by repeating the procedure, except that an equivalent quantity each of 4-chloro-thiophenol, 4-bromo-thiophenol, 4-methyl-thiophenol and 4-methoxy-thiophenol are used in place of the thiophenol used therein, there are obtained, as respective products, the 4'-chloro, 4'-bromo, 4'-methyl and 4'-methoxy derivatives of γ-phenylmercaptobutyric acid.

EXAMPLE II

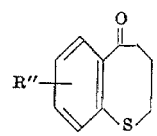
(XI)

A. To polyphosphoric acid (1 kg.) at 100°C. is added 98 g. (0.5 mole) of γ-phenylmercaptobutyric acid and the resulting mixture is heated at 100°C. for 1 hr., poured onto ice and extracted with benzene. The benzene solution is washed with dilute sodium hydroxide solution, dried and concentrated. The residual oil is distilled to give about 77 g. of 5-oxo-2,3,4,5-tetrahydrobenzo[b]thiepin, b.p. 119°–120°/1.5mm.

B. The ring-closure procedure of Example II-A is followed to prepare the compounds of formula (XI). For example, by repeating said procedure with an equivalent amount of each product prepared in Example I-B, there are obtained, as respective products, the 7-chloro, 7-bromo, 7-methyl and 7-methoxy derivatives of 5-oxo-2,3,4,5-tetrahydrobenzo[b]thiepin.

EXAMPLE III

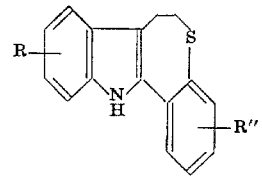
(III)

A. A 35.6 g. sample of 5-oxo-2,3,4,5-tetrahydrobenzo[b]thiepin and a 29 g. sample of phenylhydrazine hydrochloride are dissolved in 450 ml. of ethanol and the resulting solution is saturated with hydrogen chloride and refluxed for 1 hr. After cooling, the separated solid is collected by filtration and the filtrate is concentrated to give a solid, 6,7-dihydro-12H[1]benzothiepino[5,4-b]indole, which is recrystallized from methanol, yielding about 29 g. of white crystals, m.p. 155°–156°C.

B. The compounds of formula (III) may be prepared in accordance with the procedure outlined in Example III-A. For example, by using as starting materials an equivalent amount of an appropriate phenylhydrazine hydrochloride of formula (XII) and an equivalent amount of an appropriate benzothiepin of formula (XI), the following respective products are obtained:
2-chloro-6,7-dihydro-12H[1]benzothiepino[5,4-b]indole;
2,9-dichloro-6,7-dihydro-12H[1]benzothiepino[5,4-b]indole;
9-methyl-6,7-dihydro-12H[1]benzothiepino[5,4-b]indole;
9-methoxy-6,7-dihydro-12H[1]benzothiepino[5,4-b]indole;
2-bromo-9-methoxy-6,7-dihydro-12H[1]benzothiepino[5,4-b]indole;
2-methoxy-9-methyl-6,7-dihydro-12H[1]benzothiepino[5,4-b]indole;
2-methyl-6,7-dihydro-12H[1]benzothiepino[5,4-b]indole; and
2,9-dimethyl-6,7-dihydro-12H[1]benzothiepino[5,4-b]indole.

EXAMPLE IV

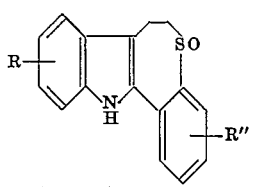

(IV)

A. 6,7-Dihydro-12H[1]benzothiepino[5,4-b]indole-5-oxide: A 75 g. sample of 6,7-dihydro-12H[1]benzothiepino-[5,4-b]indole (0.3 mole) is combined with 70 g. (0.33 mole) of sodium metaperiodate in 1100 ml. of methanol and 100 ml. of water and the resulting mixture is stirred at room temperature for 18 hrs. The mixture is then warmed to reflux and heated for 3 hrs. and then cooled. The separated solid is filtered and washed repeatedly with water and then dried. The product, 6,7-dihydro-12H[1]benzothiepino[5,4-b]indole-5-oxide, about 75 g. in the form of white crystals, melts at 202°–205°C. After recrystallization from ethanol, the m.p. is 203°–205°C.

B. The sulfide-to-sulfoxide oxidation process of Example IV-A may be followed in preparing the compounds of formula (IV). For example, by so oxidizing an equivalent amount of each sulfide obtained in Example III-B, the corresponding sulfoxides are respectively obtained.

EXAMPLE V

Equivalent amounts of 6,7-dihydro-12H[1]benzothiepino[5,4-b]indole and sodium hydride are mixed in dimethylformamide (DMF) at room temperature. One equivalent of 2-bromo-ethyl cyanide in DMF is added to the reaction mixture which is heated at 50°–60°C. for 4 hours and then cooled, diluted with 2 percent hydrochloric acid solution and extracted with methylene chloride. Concentration of the extract yields the product, 6,7-dihydro-12-(2-cyanoethyl)-12H[1]benzothiepino[5,4-b]indole, which is purified by recrystallization from isopropyl alcohol.

EXAMPLE VI

The procedure of Example V is repeated except that an equivalent amount each of chloromethyl cyanide, 3-chloropropyl cyanide and 4-bromo-butyl cyanide is substituted for the 2-bromo-ethyl cyanide used therein to yield, as respective products, the corresponding 12-cyanomethyl, 12-(3-cyanopropyl) and 12-(4-cyanobutyl) derivatives of 6,7-dihydro-12H[1]benzothiepino[5,4-b]indole.

EXAMPLE VII

By following the procedure of Example V, except that an equivalent quantity of the appropriate benzothiepino[5,4-b]-indole obtained in Example III and an equivalent quantity of the appropriate ω-halo-cyanide are used as starting materials, the following respective products may be obtained:
2-chloro-6,7-dihydro-12-(2-cyanoethyl)-12H[1]benzothiepino-[5,4-b]indole;
2,9-dichloro-6,7-dihydro-12-cyanomethyl-12H[1]benzothiepino-[5,4-b]indole;
9-methyl-6,7-dihydro-12-(3-cyanopropyl)-12H[1]benzothiepino-[5,4-b]indole; 9-methoxy-6,7-dihydro-12-cyanomethyl-12H[1]benzothiepino-[5,4-b]indole;
2-bromo-9-methoxy-6,7-dihydro-12-(2-cyanoethyl)-12H[1]benzothiepino[5,4-b]indole;
2-methoxy-9-methyl-6,7-dihydro-12-(2-cyanoethyl)-12H[1]benzothiepino[5,4-b]indole;
2-methyl-6,7-dihydro-12-(4-cyanobutyl)-12H[1]benzothiepino-[5,4-b]indole; and
2,9-dimethyl-6,7-dihydro-12-(2-cyanoethyl)-12H[1]benzothiepino-[5,4-b]indole.

EXAMPLE VIII

Equivalent amounts of 6,7-dihydro-12H[1]benzothiepino-[5,4-b]indole and sodium hydride are mixed in dimethylformamide (DMF) at room temperature. One equivalent of ethyl bromoacetate in DMF is added to the reaction mixture which is heated at 50°–60°C. for 4 hours and then cooled, diluted with 2 percent hydrochloric acid solution and extracted with methylene chloride. Concentration of the extract yields the product, 6,7-dihydro-12-(2-carbethoxymethyl)-12H[1]benzothiepino[5,4-b]indole, which is purified by recrystallization from isopropyl alcohol.

EXAMPLE IX

The procedure of Example VIII is repeated except that an equivalent quantity each of ethyl β-chloropropionate and methyl γ-bromobutyrate are used as the halo-ester starting material in place of the ethyl bromoacetate used therein to yield, as respective products, the corresponding 12-(2-carbethoxyethyl) and 12-(3-carbomethoxypropyl) derivatives of 6,7-dihydro-12H[1]benzothiepino[5,4-b]indole.

EXAMPLE X

By following the procedure of Example VIII, except that an equivalent amount each of the benzothiepino[5,4-b]-indoles obtained in Example III-B is substituted for the benzothiepino[5,4-b]indole used therein, there are obtained, as respective products, the corresponding 12-carbethoxymethyl derivatives of each of the Example III-B products, respectively.

EXAMPLE XI

10 Grams of 6,7-dihydro-12-(2-cyanoethyl)-12H[1]-benzothiepino[5,4-b]indole is mixed with 2.7 g. sodium hydroxide in 80 ml. of aqueous ethanol (70 percent) and refluxed for 5 hours. The reaction mixture is then concentrated to about one-fifth of its original volume, then diluted with water up to original volume, acidified with dilute hydrochloric acid solution and the product extracted with chloroform. The chloroform extract is concentrated and the crude product is recrystallized from ethanol to give pure 6,7-dihydro-12-(2-carboxyethyl)-12H[1]benzothiepino-[5,4-b]indole, m.p. 192°C.

EXAMPLE XII

The nitrile-to-acid hydrolysis procedure of Example XI may be followed to prepare the 6,7-dihydro-12-(ω-carboxyalkyl)-12H[1]benzothiepino[5,4-b]indoles of formula (II-d). For example, by utilizing an equivalent amount of each nitrile obtained in Examples VI and VII as the starting material to be hydrolyzed, the corresponding 12-(ω-carboxyalkyl) acids are obtained, respectively.

EXAMPLE XIII 6,7-Dihydro-12-(2-cyanoethyl)-12H[1]benzothiepino-[5,4-b]indole-5-oxide A 30 g. sample of 6,7-dihydro-12-(2-cyanoethyl)-12H[1]benzothiepino[5,4-b]indole and 24 g. of sodium metaperiodate are refluxed in 300 ml. of aqueous methanol for two hours. After cooling, the separated solids are filtered, washed repeatedly with water, and dried to give about 27 g. of white crystals, 6,7-dihydro-12-(2-cyanoethyl)-12H[1]benzothiepino[5,4-9 indole-5-oxide, m.p. 190°–192°C.

EXAMPLE XIV

The sulfide-to-sulfoxide oxidation procedures of either Example IV-A or Example XIII may be followed to prepare the compounds of formula (I-a). For example, by so oxidizing an equivalent amount of an appropriate sulfide of formula (II), the following sulfoxides are obtained as respective products:

| R | Z | R'' |
|---|---|-----|
| H | $CH_2$—CN | H |
| H | $(CH_2)_4$—CN | H |
| Cl | $CH_2$—CN | Cl |
| Me | $(CH_2)_3$—CN | H |
| MeO | $(CH_2)_3$—CN | Br |
| Me | $(CH_2)_2$—CN | Me |
| H | $(CH_2)_3$—COOMe | H |
| H | $CH_2$—COOEt | Cl |
| MeO | $CH_2$—COOEt | H |
| Me | $CH_2$—COOEt | MeO |
| H | $(CH_2)_2$—COOH | H |
| H | $(CH_2)_2$—COOH | Cl |
| Cl | $CH_2$—COOH | Cl |
| MeO | $CH_2$—COOH | H |
| Me | $(CH_2)_2$—COOH | MeO |

EXAMPLE XV 6,7-Dihydro-12-(2-cyanoethyl)-12H[1]benzothiepino-[5,4-b]indole-5-oxide A 50 g. sample of 6,7-dihydro-12[1]-benzothiepino[5,4-b]indole-5-oxide (0.18 mole) is suspended in 300 ml. of acrylonitrile and 15 drops of trimethyl benzyl ammonium hydroxide (TRITON B) are added cautiously and slowly. The mixture gradually warms up and becomes homogeneous. It is allowed to stand overnight and the separated solid is filtered off, washed with a small amount of acrylonitrile, then ether, and dried. The filtrates are concentrated, triturated with chloroform and insoluble solids are removed by filtration. The chloroform filtrates are concentrated and the residue gives about 14 g. of 6,7-dihydro-12-(2-cyanoethyl)-12H[1]-benzothiepino[5,4-b]indole-5-oxide, total yield 45 g. (75%), m.p. 192°–193°C.

EXAMPLE XVI

The procedure of Example XV is repeated, except that an equivalent quantity of each sulfoxide obtained in Example IV-B is substituted for the 6,7-dihydro-12H[1]benzothiepino-[5,4-b]indole-5-oxide used therein, to yield, as respective products, the following 12-(2-cyanoethyl) sulfoxides of formula (I-a):

| R | R'' |
|---|-----|
| H | Cl |
| Cl | Cl |
| Me | H |
| MeO | H |
| MeO | Br |
| Me | MeO |
| H | Me |
| Me | Me |

EXAMPLE XVII

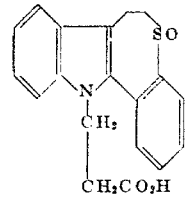

A. 6,7-Dihydro-12-(2-carboxyethyl)-12H[1]benzothiepino[5,4-b]indole-5-oxide

A 35.5 g. (0.11 mole) sample of 6,7-dihydro-12-(2-cyanoethyl)-12H[1]benzothiepino[5,4-b]-indole-5-oxide is hydrolyzed by refluxing in 500 ml. of aqueous ethanol (70%) for 6 hrs. in the presence of 10 g. (0.25 mole) of sodium hydroxide. After concentration, the mixture is diluted with water and extracted with chloroform. The aqueous layer is acidified with dilute HCl and extracted with chloroform. The combined chloroform layers in turn are extracted with potassium carbonate solution and after acidification of the latter the product is taken up in chloroform. Concentration of the chloroform extract gives a solid, 6,7-dihydro-12-(2-carboxyethyl)-12H[1]benzothiepino[5,4-b]indole-5-oxide, which is recrystallized from ethanol, as white crystals, m.p. 191°–193°C.

B. The hydrolysis procedure of Example XVII-A is repeated, except that an equivalent quantity of each 12-(2-cyanoethyl) sulfoxide obtained in Example XIV and Example XVI is used as the starting material, to yield, as respective products, the corresponding 12-(2-carboxyethyl) sulfoxides.

EXAMPLE XVIII

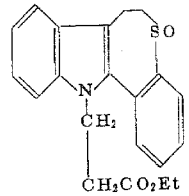

A. 6,7-Dihydro-12-(2-carbethoxyethyl)-12H[1]benzothiepino[5,4-b]indole-5-oxide

A 9.1 g. of 6,7-dihydro-12-(2-carboxyethyl)-12H[1]benzothiepino[5,4-b]indole-5-oxide is esterified by refluxing in ethanol, in the presence of a few drops of concentrated sulfuric acid for 4 hrs. The mixture is concentrated and the residue taken up in chloroform, washed with potassium carbonate solution and concentrated to give a solid, 6,7-dihydro-12-(2-carbethoxyethyl)-12H[1]benzothiepino-[5,4-b]indole-5-oxide, which after three recrystallizations from ethanol gives the pure product, m.p. 146°–147°C.

B. The esterification procedure of Example XVIII-A may be followed to prepare the sulfoxide esters of formula (I-a). For example, by using a lower alkanol such as ethanol and n-propanol as the esterifying alcohol and an equivalent amount of each sulfoxide acid obtained in Example XIV and Example XVII as the acid to be esterified, the corresponding ethyl and propyl esters, respectively, of each such acid are obtained.

EXAMPLE XIX

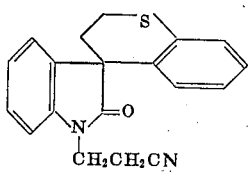

A. 1-(2-Cyanoethyl)-2-oxospiro[indoline-3,4'-thiochroman]

A 6 g. (0.019 mole) sample of 6,7-dihydro-12-(2-cyanoethyl)-12H-[1]benzothiepino[5,4-b]indole-5-oxide is refluxed for 5 hrs. with 75 ml. of 18 percent hydrochloric acid. The separated solid is filtered, stirred in chloroform with alumina and charcoal, filtered and the chloroform solution concentrated and then passed through acid-washed alumina with chloroform and concentrated to give 1-(2-cyanoethyl)-2-oxospiro[indoline-3,4'-thiochroman] as white crystals, m.p. 185°–186°C.

B. The procedure of Example XIX-A is followed to prepare those compounds of formula (I-b) wherein R' is CN. For example, by utilizing, as the formula (I-a) nitrile precursor, an equivalent amount of each of the nitriles described in Examples XIV and XVI, the corresponding nitrilespiro compound of formula (I-b) is respectively obtained.

EXAMPLE XX

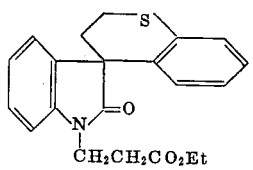

A. Ethyl 2-oxospiro[indoline-3,4'-thiochroman]-1-propionate

A 20.8 g. (0.062 mole) sample of 6,7-dihydro-12-(2-carbethoxyethyl)-12H[1]benzothiepino[5,4-b]indole-5-oxide is suspended in benzene (450 ml.) and stirred vigorously with 13 g. (0.1 mole) of oxalyl chloride for 3½ hrs. The resulting yellow solid is filtered, dissolved in ethanol and refluxed for 2 hrs. Concentration to ½ volume and cooling separates about 14.3 g. of ethyl 2-oxospiro[indoline-3,4'-thiochroman]-1-propionate as white crystals, m.p. 152°–153°C.

B. A solution of 0.2 g. of 6,7-dihydro-12-(2-carbethoxyethyl)-12H[1]benzothiepino[5,4-b]indole-5-oxide in benzene is treated with 0.2 ml. of acetyl chloride at room temperature for 4 hrs. Concentration yields the solid product, ethyl 2-oxospiro-[indoline-3,4'-thiochroman]-1-propionate.

C. The procedures of Example XX-A and Example XX-B may each be followed to prepare those compounds of formula (I-b) wherein R' is COO(loweralkyl). For example, by utilizing, as the formula (I-a) ester precursor, an equivalent amount of each of the esters described in Examples XIV and XVIII, the corresponding ester-spiro compound of formula (I-b) is respectively obtained.

EXAMPLE XXI

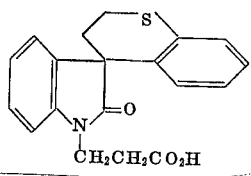

A. 2-Oxospiro[indoline-3,4'-thiochroman]-1-propionic acid

A 7.7 g. (0.021 mole) sample of ethyl 2-oxospiro[indoline-3,4'-thiochroman]-1-propionate is hydrolyzed by refluxing in aqueous ethanol in the presence of 0.9 g. (0.022 mole) of sodium hydroxide for 4½ hrs. After concentration and dilution with water, the solution is extracted with ether and acidified, and then extracted with chloroform. Concentration of the chloroform extract gives an oil which crystallizes in ethyl acetate-cyclohexane. Recrystallization from the same solvents yields 2-oxospiro[indoline-3,4'-thiochroman]-1-propionic acid as offwhite crystals, m.p. 144°–146°C. ($V_{Max.}^{KBr}$ 1720, 1700, 1660, 1600 cm.$^{-1}$)

B. The foregoing ester-to-acid hydrolysis procedure may be used to prepare the acid-spiro compounds of formula (I-b). For example, by repeating the hydrolysis procedure of Example XXI-A, except that an equivalent quantity of each ester obtained in Example XX-C is used as the starting ester to be hydrolyzed, there are obtained, as respective products, the corresponding acid-spiro compounds of formula (I-b).

EXAMPLE XXII

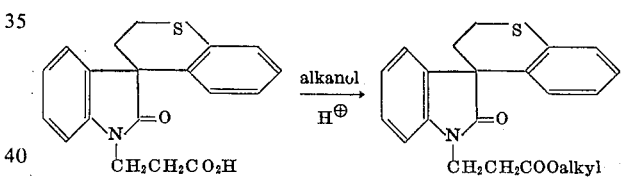

This example illustrates an esterification procedure which can be followed for the purpose of converting the acids of formula (XIV) into the corresponding esters of formula (XV) by treatment of the former with an appropriate lower alkanol.

A 10 percent solution of 2-oxospiro[indoline-3,4'-thiochroman]-1-propionic acid in ethanol is refluxed for 4 hours in the presence of a catalytic amount of a mineral acid (such as concentrated sulfuric acid or dry hydrogen chloride). After concentration to one-third of the original volume, the solution is chilled and the product, ethyl 2-oxospiro[indoline-3,4'-thiochroman]-1-propionate, precipitates and is collected by filtration and recrystallized from ethyl acetate; m.p. 152°–153°C.

I claim:

1. A method of preparing a 2-oxospiro[indoline-3,4'-thiochroman] derivative of the formula:

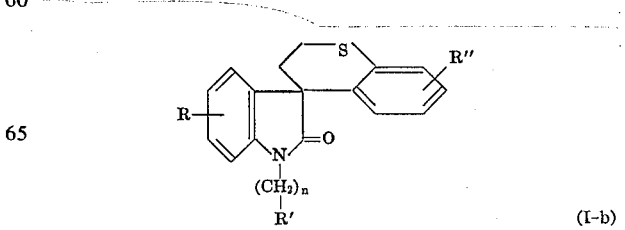

(I-b)

wherein $n$ is an integer from 1 to about 4, R and R″ are each a member selected from the group consisting of hydrogen, halo, loweralkyl and loweralkoxy, and R′ is a member selected from the group consisting of CN, COOH and COO(loweralkyl), which comprises treating a 6,7-dihydro-12H[1]benzothiepino[5,4-b]-indole-5-oxide of the formula:

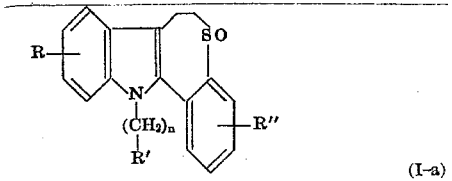

(I-a)

wherein $n$, R, R′ and R″ are as previously described, with from 1 to about 2 molecular equivalents of a member selected from the group consisting of acetyl chloride and oxalyl chloride in an anhydrous aprotic solvent.

2. A method of preparing a 2-oxospiro[indoline-3,4′-thiochroman] derivative of the formula:

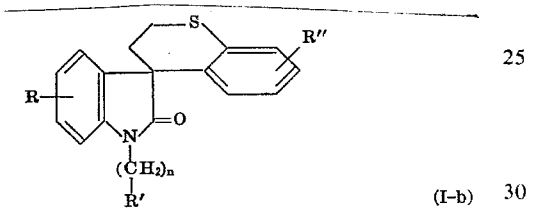

(I-b)

wherein $n$ is an integer from 1 to about 4, R and R″ are each a member selected from the group consisting of hydrogen, halo, loweralkyl and loweralkoxy, and R′ is a member selected from the group consisting of CN, COOH and COO(loweralkyl), which comprises treating a 6,7-dihydro-12H[1]benzothiepino[5,4-b]-indole-5-oxide of the formula:

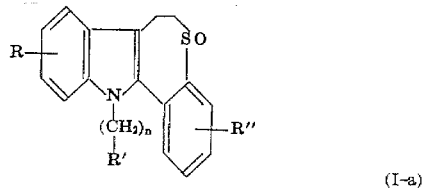

(I-a)

wherein $n$, R, R′ and R″ are as previously described, with from 1 to about 2 molecular equivalents of acetic acid anhydride at 80°–90°C. in an anhydrous aprotic solvent.

* * * * *

UNITED STATES PATENT OFFICE
CERTIFICATE OF CORRECTION

Patent No. 3,818,038     Dated June 18, 1974

Inventor(s) Vasken Paragamian

It is certified that error appears in the above-identified patent and that said Letters Patent are hereby corrected as shown below:

Column 2

In the reaction scheme (c) at the bottom of the page, the portion shown as:

$$\underset{\text{benzene}}{\xrightarrow{\text{NaH}}} \quad \text{should be corrected to read} \quad \underset{\text{benzene}}{\xrightarrow{\text{KOH}}}$$

Column 7

In Formula (I-a, preferred), the positioning of the R" substituent was misplaced. In addition, the R' substituent was not included. The structural formula should be corrected accordingly to appear as follows:

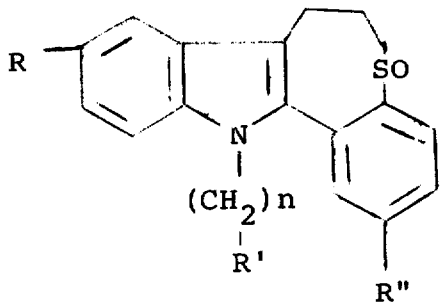

and (I-a, preferred)

Signed and sealed this 6th day of May 1975.

(SEAL)
Attest:

RUTH C. MASON
Attesting Officer

C. MARSHALL DANN
Commissioner of Patents
and Trademarks